CONTINUOUS PROCESS

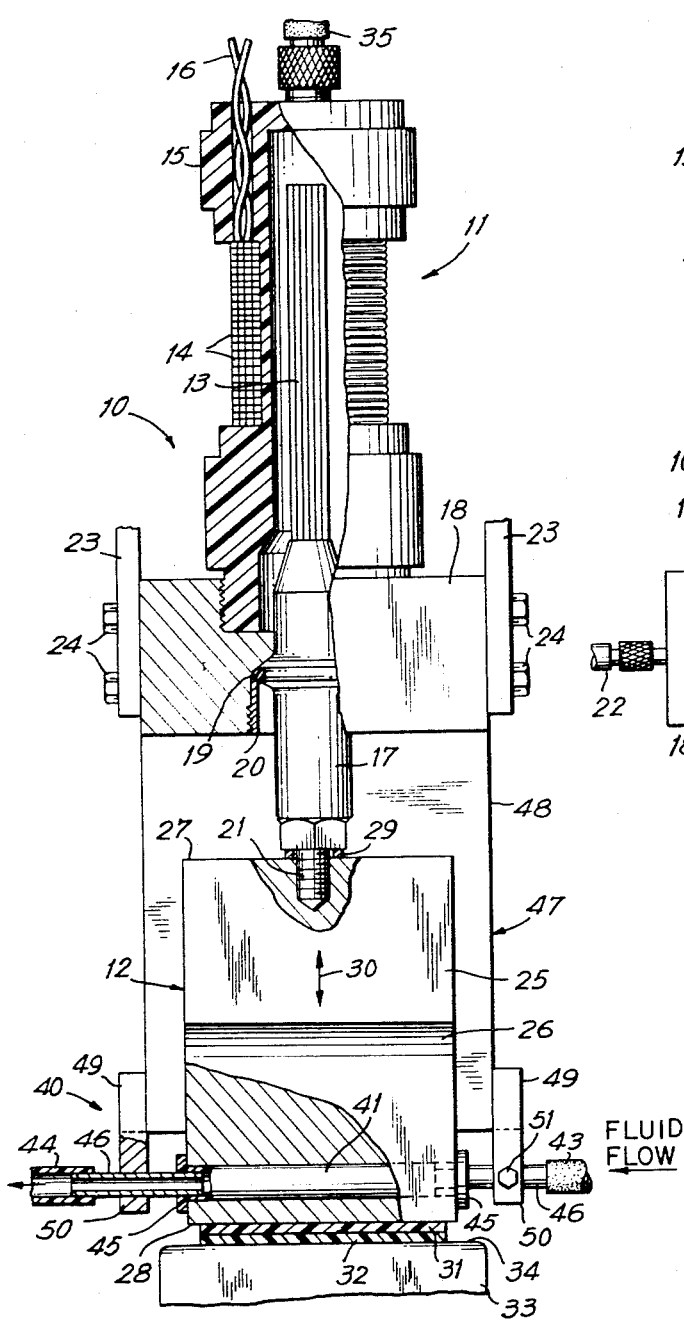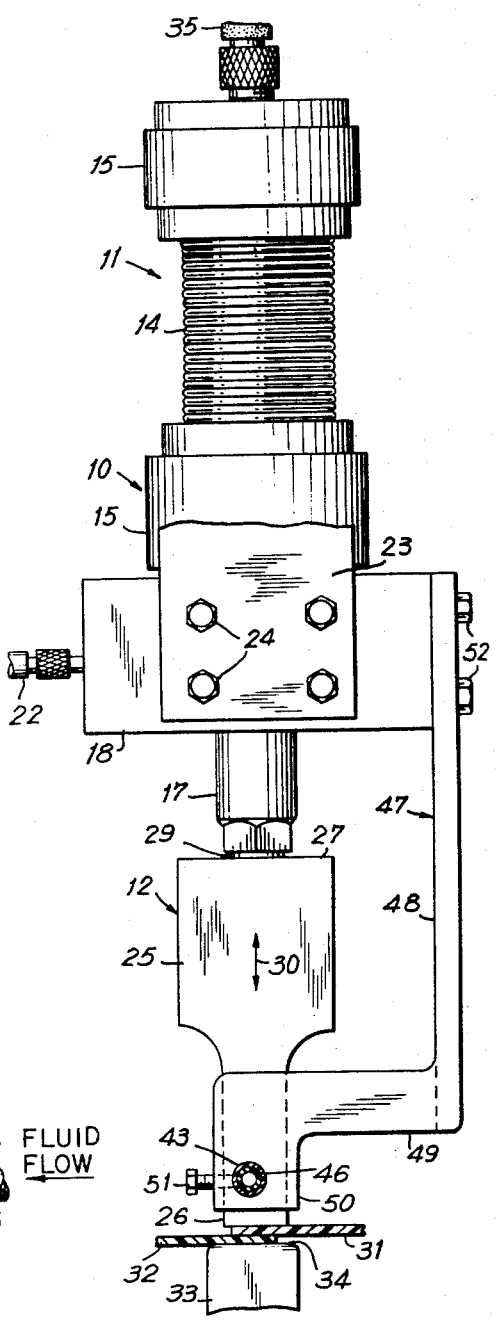
FIG. 1
FIG. 2
INVENTORS.
LEWIS BALAMUTH
CLIFFORD A. ROBERTSON
BY
Leonard W. Suroff
ATTORNEY

INTERMITTENT PROCESS

INVENTORS.
LEWIS BALAMUTH
CLIFFORD A. ROBERTSON
BY
Leonard W. Suroff
ATTORNEY

INVENTORS.
LEWIS BALAMUTH
CLIFFORD A. ROBERTSON
BY
Leonard W. Suroff
ATTORNEY

United States Patent Office 3,438,428
Patented Apr. 15, 1969

3,438,428
METHOD FOR MAINTAINING A VIBRATORY TOOL AT A CONTROLLED TEMPERATURE
Lewis Balamuth, New York, and Clifford A. Robertson, Bay Shore, N.Y., assignors to Cavitron Corporation, Long Island City, N.Y., a corporation of New York
Filed Mar. 4, 1965, Ser. No. 437,238
Int. Cl. B23k *1/06;* B29c *19/02*
U.S. Cl. 165—1   2 Claims This invention relates to high frequency or ultrasonic devices for material working and more particularly to methods and apparatus for maintaining the working surface of a vibratory tool at a controlled temperature.

There are numerous applications currently practiced of material working in which a tool is vibrated at high or ultrasonic frequencies and a portion of the tool, for example, its working face, is pressed against a workpiece or in close proximity thereto, so that the vibratory energy emitted therefrom is transmitted to the workpiece. Known methods in which this type of high frequency energy, for example, 1,000 cycles per second or more, or even ultrasonic vibrations are utilized, are in the forging, dimpling, forming, extruding of metals, in the welding of plastics or metals, in cleaning and coating of materials, to mention but a few of the present applications of high frequency vibratory energy.

This invention may be usefully applied to the above mentioned operations and more particularly is applicable to those operations where it is desirable and advantageous that the vibratory working face of the tool be maintained at a controlled working temperature. A number of the applications of high frequency vibrations which have been proposed and practiced have been handicapped, although technically feasible, by the inability to maintain the object or the working face of the vibrator at a steady state temperature during a given work cycle. Thus, in order to practice certain ultrasonic material working processes, it is essential that the working face or surface of the tool, which does the actual transmission of energy to a workpiece, be maintained continually at a preselected surface temperature.

For practical, high frequency mechanical processing, it is, in almost every important commercially useful case, essential to also maintain the vibratory level of the working tool constant over long periods of time without having to adjust the equipment. If proper attention is not paid to this basic fact, then the vibratory level or output amplitude of vibration of the transducer will generally fluctuate significantly over an extended period of time. Although automatic frequency controls are usually provided in the equipment, a fluctuation in the tool temperature affects its vibratory characteristic which is not always capable of automatic adjustment. When this happens in practice, recourse is generally had to a manual adjustment whereby the equipment must usually be stopped, in effect causing down time and resultant loss of profitable production time. In other high frequency applications, it is essential that the work object be maintained at a constant temperature or not subjected to impulses of high or low sources of heat.

Apparatus for performing a variety of material working processes generally comprise a transducer, a toolholder or connecting body extending from the transducer and a tool secured to the connecting body.

The heating of the tool output surface generally originates from two sources. The first, and usually the most prevalent, is the inherent inefficiency of the tool to transmit all of the high frequency vibratory energy imparted to it by the transducer.

The vibratory tool is generally characterized in having an input surface that is secured to the connecting body and an opposed output surface for transmission of the vibratory energy imparted thereto with a plane of maximum axial stress therebetween. This plane of maximum axial stress may coincide with the nodal plane of the tool or be displaced therefrom depending upon the tool design. The nodal plane is the dynamic center of the tool in which no longitudinal vibratory motion occurs as compared with the input and output surfaces where the amplitude or longitudinal vibration is at a maximum. It is at this plane of maximum axial stress, which may also be a node of longitudinal motion, that the greatest quantity of vibratory energy is converted into heat during the operation of said tool. The quantity of heat generated in this maximum axial stress area is usually greater than the normal ability of the atmosphere to absorb said heat and in turn results in the heating of said overall tool.

The vibratory tool is actually expanding and contracting in the order of at least 1,000 cycles per second and in many applications at least 20,000 cycles or greater per second. This expansion and contraction of the total length of the vibratory tool, which might be anywhere from .0001 to .01 inch per second, creates internal friction between the molecules of the material from which the tool is constructed and a resultant heating of the work tool. An unloaded tool, which is one not in contact with a work object and driven for about one hour, may easily rise in temperature so that its output surface measures 200° F.

Since we are dealing with a balanced system, in that the tool is of a predetermined length and designed to vibrate at a specific frequency, the heated tool has an effect on this balance. What tends to occur is that the heat causes a physical expansion of the total length of the tool. In addition, the magnetostrictive properties change, resulting in a change of the amplitude of vibration of the working face or output surface of the tool as well as the frequency of vibration.

The second source of heat generated at the tool working or output surface results from the latter's engagement with the work piece. It should be pointed out that the workpiece contemplated by this invention may be of any material and in either a solid, liquid, vapor or gaseous state when it is subjected to the high frequency vibratory energy.

When the output surface of the tool is brought into energy transferring relationship to a workpiece, it has been found that a certain quantity of heat attributable to friction is generated at the tool output surface. This heating is present, although to a lesser extent, due to the known antifriction phenomenon of ultrasonically vibrated members that are in engagement with a workpiece.

The applicants, being thoroughly cognizant of the difficulties in practice, have found a very simple method and apparatus, whereby the aforesaid amplitude of vibration and the temperature of the workpiece and/or tool working face may be simultaneously controlled without recourse to complicated mechanisms.

It is the general object of the present invention to avoid and overcome the foregoing and other difficulties by providing a novel method and apparatus for maintaining a vibratory tool at a preselected temperature level particularly suited to various material working applications.

Another object is to provide a novel method and apparatus to simultaneously maintain the amplitude of longitudinal vibration and the tool working face at a preselected amplitude and temperature settings, respectively, without resort to automatic tuning in a continuous material working process.

A further object of the present invention is to provide a novel method and apparatus of maintaining the output surface of a vibratory tool, which is in energy transferring relationship to a work object, at a substantially constant temperature.

Yet an additional object is to provide a novel method and apparatus for controlling the temperature of the output surface of a vibratory tool that is used on an intermittent material working process.

Still another object is to provide a method and apparatus to maintain the workpiece in engagement with a vibratory tool at substantially a constant temperature during a given work process.

An additional object of the present invention is to provide improved methods and apparatus for the joinder of materials utilizing high frequency energy.

Yet another object of the present invention is to provide a novel device which is simple in construction, which is easy to mount, and which efficiently transfers heat between the vibratory tool face and a fluid flowing through the tool.

Thus, in its broader aspects, this invention contemplates the maintaining of the vibratory working face of the tool at substantially a constant or at a controlled temperature and depending upon the ultrasonic application, this temperature might vary from substantially below room temperature to considerably above, for example, from the normal boiling point of liquid helium to a temperature range in which the elastic limit of the material from which the tool is fabricated is still retained. Since this invention finds ideal application for the sealing of thermoplastic materials, the method and apparatus will be described, for the purpose of illustration, in connection therewith. Sealing of thermoplastic materials is an application in which it is desirous to maintain the tool output surface below the melting temperature of the materials being joined.

In ultrasonic sealing of thermoplastic materials, difficulty has been encountered in obtaining consistent seals on production equipment. Although there has been a growing use of sonic and ultrasonic energy for sealing of thermoplastic materials, and the results to date clearly indicate that it is possible to replace heat sealing systems, the use of this high frequency equipment has failed when placed on equipment that required consistent seals over long periods of time.

In existing production sealing equipment, the plastic sheets are placed in overlapping relationship and positioned between a back-up member and the output surface of a high frequency vibratory tool. The seal is accomplished by urging the tool and back-up member against the thermoplastic members by a moderate static force with the plastic to be sealed positioned therebetween, and the working face of the tool vibrating at a frequency of from 15,000 to 30,000 cycles per second.

The principal object has been that, when the equipment is initially adjusted, there is a fixed gap between the operating surfaces of the tool and back-up member. This spacing is determined by considering the thicknesses of the plastic sheets being joined and the static pressure to be maintained during the sealing operation. Initially, excellent seals are obtained, but as the automatic sealing operation continues, heat is generated at the face of the tool by its intermittent contacts with the plastic sheets and internal friction of the tool. In normal heat sealing of plastic materials, this might even be desirable, but in sonic or ultrasonic sealing, it can be catastrophic.

The applicants, by the use of their invention, have found it possible to maintain the fixed gap and amplitude of vibration with the result that consistent seals are continuously obtained. It can be appreciated that, with the materials being sealed only having a thickness from .001 to .025 thousandths of an inch, any change of length in the work tool without a simultaneous adjustment of the work gap becomes critical. The heating of the tool causes a decrease in the amplitude of vibration, and as a result, irregular seals are obtained. When the temperature of the working face of a vibratory tool becomes substantially greater than normal room temperature, for example, 75° F., and is brought into mechanical contact with the plastic members to be sealed, an unwanted flow of heat occurs at the sealing area causing a weakening of the plastic in the immediate area adjacent the seal which in turn substantially reduces the overall strength of the seal.

In addition, the principles of the present invention are broadly applicable to those applications in which it is desirous of maintaining the tool output surface or workpiece at an elevated temperature. In this type of application, additional heat may be supplied to the tool as by a fluid such as steam to maintain the tool at an elevated temperature as compared to those applications in which unwanted heat is removed from the tool.

In its essential aspects, the method and apparatus of this invention embraces the use of a vibratory tool having a working face positioned in energy transferring relationship to a workpiece or object. A source of energy transferring fluid is supplied through a passage to conduct heat between said fluid and tool to maintain the output surface of the latter at a controlled temperature. The temperature of the fluid as it enters the tool passage will depend on the application for which the equipment is to be applied. The fluid used may be a liquid, gas or an atomized mixture of materials. The advantage of using a gas vapor, or atomized mixture is that a minimum of acoustic loading of the tool occurs.

This invention further comprehends the provision of supplying a heat transferring fluid and causing it to continuously flow through a vibratory tool having a work face while said tool is vibrated at a high or ultrasonic frequency in the range of 1,000 to 100,000 cycles per second, by suitable transducer means. The vibratory tool is mounted to present its vibrating working face in energy transferring relationship to a work object and is provided with one or more internal passages, having a sufficient surface area and a portion thereof which extends parallel to the tool working face. As the fluid passes through the passage in the vibratory tool, and depending upon the temperature of said fluid, an energy transfer in the form of heat flow will occur between the fluid and the working face of the vibratory tool to control the temperature of said tool output surface. The temperature of the fluid, which may be a gas, liquid or any combination of the two, will be determined by the desired temperature of the output surface or working face of the tool.

In accordance with one aspect of the present invention, the work tool is rigidly coupled at one end thereof or at its input surface to the vibratory end of the transducer by a connecting body with the work tool and connecting body having a combined length substantially corresponding to an integral number of half-wavelengths of sound traveling longitudinally through the material of the connecting body and work tool at the frequency of vibration of the transducer. The other end of the tool or its output surface is maintained in energy transferring relationship to a work object. One or more passages are provided internally in the work tool, and through which a fluid capable of transmitting energy in the form of heat between said fluid and the work face to maintain the latter at substantially a constant operating temperature is continuously flowed.

The above, and other objects, features and advantages of the invention, will be apparent in the following detailed description of illustrative embodiments thereof which is to be read in connection with the accompanying drawings forming a part hereof, and where:

FIG. 1 is a front elevational view, partly broken away and in section, of an apparatus embodying the invention for maintaining the working face of a vibratory tool at a controlled temperature;

FIG. 2 is a side elevational view, of the apparatus of FIG. 1;

Figure 3:
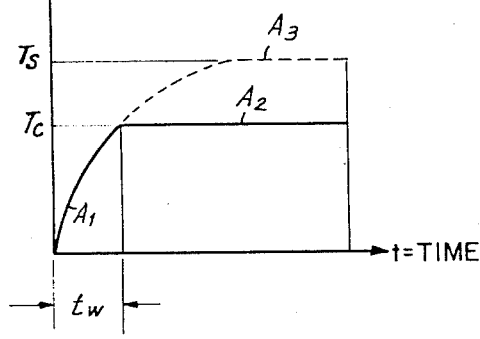
FIG. 3 is a graph showing the surface temperature of the tool working surface during a continuous material working process.

Referring to the drawings in detail, wherein similar reference numerals refer to similar parts in the several views, and initially to FIGS. 1 and 2 thereof, it will be seen that apparatus 10 for maintaining the output surface of a vibratory tool at a controlled surface temperature may include an electromechanical transducer 11 which is rigidly secured to a vibratory tool 12 and supply means 40 for continuously flowing a heat transferring fluid through said tool to maintain its working face 28 at a preselected temperature.

The transducer 11 may be any one of a number of electromechanical types, such as electrodynamic, piezoelectric or magnetostrictive. However, for the purposes of the present invention, transducer 11 is preferably of the magnetostrictive type. A more complete discussion of the transducer 11 may be found in United States Patent No. 3,123,951, granted Mar. 10, 1964, titled "Ultrasonic Cleaning of Grinding Wheels" and assigned to the present assignee. For the purposes of the present invention, it is important to note that this apparatus includes a stack of plates 13 of magnetostrictive material, around which is wound a magnetic coil 14, in well known fashion. The coil 14 is supported on a non-magnetic sleeve 15 and connected via leads 16 to a source of alternating electrical energy of suitable frequency (not shown).

One end of the magnetostrictive stack 13 is rigidly fastened to an elongated connecting body 17, which is rigidly mounted in a support block 18. The connecting body 17 is provided with a peripheral depression at its midpoint which retains a rubber O-ring 19 fitting into a corresponding depression in the support block 18. A retaining ring 20 threadedly engages the block 18 to prevent movement of the O-ring and yet permit disassembly of the structure when desired. The non-magnetic sleeve 15 is threadedly received in the support block 18.

Upon application of alternating current to the coil 14, the magnetostrictive stack 13 expands and contracts in length at a rate equal to the frequency of the alternating current. The resultant mechanical motion is coupled to the connecting body 17 which is provided at its other end with a threaded portion 21 for engaging the vibratory tool at its input surface to be described hereinafter. The connecting body 17 is made equal in length to a halfwave length at the frequency of vibration in the material of which it is formed. Consequently, its midpoint, and thus the mounting ring, is at a node of motion and may be rigidly fixed in the support block 18 without affecting its amplitude of vibration.

A gas or liquid coolant is introduced into the transducer housing by tube 22 (FIG. 2) which extends from the support block 18 and communicates with the inner area of the sleeve 15 by means of a bore (not shown). The coolant flows through the sleeve 15, thereby cooling the stack 13 and that portion of the connecting body 17 contained in the sleeve 15. The coolant then exists from the interior of sleeve 15 by means of tube 35 positioned on the upper surface of said sleeve.

As seen in FIGS. 1 and 2, the entire structure including the transducer and vibratory tool can be supported by various means, for example, such as by brackets 23 rigidly secured as by bolts 24 to the support block 18. Since substantially no vibratory energy is imparted to the support block 18, by virtue of its coupling the connecting body 17 at its nodal point, this mounting arrangement imparts no vibrational energy to the remainder of the equipment with which it is used.

The high frequency vibratory energy is transmitted to a work object by means of the vibratory tool 12. The tool may have various configurations and may be driven by one or more electromechanical transducers rigidly connected thereto. For the purposes of the present invention, the vibratory tool 12 is in the form of an acoustic impedance transformer and may be a solid block of metal such as aluminum alloy or monel. The tool is made of a length equal to one half wavelength (or an integral number thereof) at the frequency of vibration of the transducer 11. The upper portion 25 of the tool 12 is connected to the lower portion of the connecting body 17 by means of the threaded stud 21 depending therefrom and engageable with a threaded hole formed in the tool 12. To assure a proper tranmission of vibratory energy, which might be in the order of 5,000 to 100,000 cycles per second from the transducer 11 to the tool 12 at its input surface 27, a metal washer 29 is interposed therebetween. The portion 25 coupled to the connecting body 17, is of relatively greater mass than the other or free end 26. The transition region between the two sections of differing mass is located at approximately the nodal or quarter wave point along its length. The difference in mass between the two halves of the element 12 effect an acoustic impedance transformation which increases the amplitude of vibration at the free end relative to the driven end in inverse ratio to their masses. A more complete discussion of the acoustic impedance transformer may be found in United States Patent No. Re. 25,033, granted Aug. 29, 1961, and assigned to the present assignee. For the purposes of the present invention, it is sufficient to note that the application of a relatively small longitudinal vibration to the end 25 of the tool 12 at its input surface 27 thereof, will produce an amplified longitudinal vibration at its output surface or working face 28 in the direction indicated by the double headed arrow 30. Thus, the vibration induced in the magnetostrictive stack 13 is coupled through connecting body 17 and amplified in the vibrating tool 12.

The above described apparatus is principally the combination utilized in various present material working applications in which high frequency energy is imparted to a workpiece or object. The output surface or working face 28 of the vibratory tool 12, which is vibrating at a high frequency, is positioned in energy transferring relationship to a workpiece. To properly transfer high frequency vibratory energy, the working face may be placed in contact with and under a static pressure, to a corresponding surface area of the workpiece to assure intimate contact and a transfer of a major portion of the vibratory energy. Ultrasonic applications falling into this category are, for example, plastic sealing, welding of materials, dimpling, forming and extruding, to name but a few.

In contrast to this, the vibratory energy might be imparted to a workpiece through a liquid or gaseous medium, for example, in ultrasonic cleaning, the output surface is usually maintained in close proximity to the workpiece and the energy is imparted to the surface of said workpiece through the liquid medium. The workpiece may also be composed of either a liquid or gas rather than a solid material. Thus, a tool may be in energy transferring relationship to a work load or object whether it is in physical contact with it or not.

The point of immediate importance is that a vibratory system as above described will generate heat within the magnetostrictive stack 13, connecting body 17 and vibratory tool 12. Various methods have been devised to remove the excess heat from the stack and connecting body and as herein illustrated a coolant is introduced into the transducer housing to maintain same at a controlled temperature.

The applicants have discovered that it is possible to control the temperature of the tool and particularly its working surface by flowing a confined heat transferring fluid in contact with said tool at a rate sufficient to maintain the desired temperature at the working surface. This heat transferring fluid is preferably coupled through a passage provided in the tool, and depending upon the application, a major portion of this passage may be positioned adjacent to the tool working surface or in a plane of high axial stress.

Thus, an important aspect of this invention is that it is possible to regulate the temperature of the tool output surface over an extremely wide temperature range, for example, minus 100° F. to 1500° F., without in any way injuring the remaining components of the vibratory motor or the workpiece or object themselves. This is accomplished by providing a closed hydraulic system, which may contain pumping means to continuously circulate the heat transferring fluid in energy transferring relationship with the vibratory tool.

In numerous applications of high frequency material working, it is most important to control the temperature of the output surface of the tool at some preselected level. This level might be substantially constant in a continuous material working process, which is one wherein there is a continuous transfer of vibratory energy to a workpiece. In an intermittent operation, which is any one in which there is a dwell time between successive work periods or operations, for example, certain plastic sealing operations, the controlled temperature level might be permitted to vary within defined limits without adversely affecting the workpiece. Thus, in an intermittent operation, the controlled temperature could include variations, but in a predetermined pattern as will hereinafter be explained.

The applicants, being thoroughly cognizant of the importance of controlling this surface temperature, have found a very simple method whereby the aforesaid temperature fluctuation is maintained within a controlled pattern. In order to achieve this effect in accordance with the invention, it is necessary to give careful consideration to the fluid flow cycle, the fluid composition and the surface area of the passage in the tool as well as its position to the working face of the tool.

This basic concept of tool heating on a continuous or intermittent process will now be further explained with reference to FIGS. 3 and 4 in which the temperature of the tool output surface is plotted as a function of time for the above two processes, respectively.

This invention is applicable to continuous as well as intermittent material working operations. FIG. 3 illustrates the use of this invention on a continuous process. In practice the equipment may be turned on so that the equipment has a chance to warm up prior to its being placed in operation. This warming-up period may occur when the equipment is in a loaded or unloaded position. In either case, the tool output surface rises in temperature. Thus, in the period $tw$, which is the warm-up period, the tool working surface will reach a temperature $Tc$ as indicated by curve $A_1$. For purposes of discussion, let us assume that at this moment, the work operation and the flow of the fluid through the tool is commenced. Then, by properly controlling the rate of fluid flow and its temperature, it is possible to maintain the tool working surface at the level $Tc$ as indicated by Line $A_2$ of FIG. 3. In contrast to this, for a continuous operation in which no cooling system is provided, the tool surface temperature would continue to rise as indicated by curve $A_3$ until the steady state temperature designated $Ts$ would be reached. At this temperature, the heat dissipated is equal to the energy continuously appearing within the tool from internal friction and friction from the tool being in energy transferring relationship to the workpiece.

Thus, for a properly designed continuous material working system, it is possible to maintain the surface temperature of the tool working face at substantially a constant temperature by continuously flowing a heat transferring fluid therethrough.

In an intermittent operation, a quantity of energy in the form of heat is imparted to the tool during each work cycle from its contact with the workpiece. In addition, heat is continuously generated within the tool whenever it is caused to vibrate, so that during a work period in which vibratory energy is being imparted to a workpiece, the greatest amount of heat is created within the tool.

Figure 4:
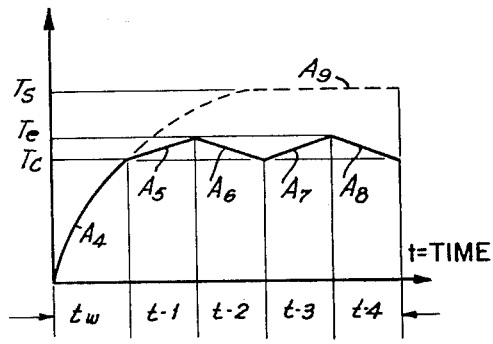
FIG. 4 is a graph showing the surface temperature of the tool working surface for an intermittent material working process.

Referring now to FIG. 4, it will be seen that the time for a complete work cycle is $t$ which is subdivided into $t-1$ and $t-2$. Initially, the equipment is permitted to warm up in a period $tw$, during which time the tool output surface reaches a temperature $Tc$ as indicated by curve $A_4$. $t-1$ is the work period during which time there is a transfer of energy to a workpiece or object, and $t-2$ is the time interval between work periods during which time the work object is removed and the succeeding one is positioned in place.

Under the above condition for any system, there is a net change in the tool temperature during the period $t-1$. During this period, the tool is energized and maintained in energy transferring relation to the workpiece. Heat is being generated within the tool during this period $t-1$ at a rate greater than can be dissipated into the atmosphere. This rise in temperature, without the present invention, would substantially continue if unchecked and eventually reach a steady state temperature $Ts$ as indicated by curve $A_9$. This temperature, for example, in a plastic sealing operation might easily be over 200° F. and injurious to the strength of the seal obtained.

In accordance with this invention, a fluid capable of removing the heat generated within the tool and particularly at its working surface is caused to flow through a passage in contact with said tool at a rate sufficient to maintain the desired temperature at said working surface. This fluid might be circulated continuously or in sequence with the work cycle or operation.

The tool having initially reached the temperature $Tc$ as indicated by curve $A_4$ in the warm-up time $tw$ is then placed in energy tanrsferring relationship to the workpiece or object. During this period time, a coolant may be circulated through the tool to remove the heat generated from internal and external frictional forces. Depending upon the rate of flow, positioning of the passage through which said fluid flows as well as its entrance temperature, the tool output surface may be maintained at substantially a constant temperature or permitted to rise slightly during this phase of the work period. As illustrated in FIG. 4, an application of these principles is illustrated in which the tool output surface has been permitted to rise in temperature from $Tc$ to $Te$ as indicated by curve $A_5$ in the time $t-1$. Then, in the dwell time $t-2$, the tool output surface temperaturs is continuously reduced until it again reaches the starting temperature of $Tc$ as indicated by curve $A_6$ for the next work operation. This cycle may be repeated as indicated by curve $A_7$ in which the tool again rises in temperature in the period $t-3$ until temperature $Te$ is reached and again, due to the fluid flowing in heat transferring relationship, a decrease occurs as indicated by curve $A_8$ in the period $t-4$.

Thus, the use of this invention is also intended for any material working process in which there is a dwell time between successive work periods of operations. The application of this invention is not limited by any ratio of $t-1$ to $t-2$ or any temperature change between $Tc$ and $Te$ during a given work period.

To illustrate the use of the present invention, an application of ultrasonic welding or sealing of sheet materials has been selected. As illustrated in FIGS. 1 and 2, the materials illustrated are plastic and for a simple overlap type of weld or seal, the plastic sheets 31 and 32 are arranged to provide a small overlap on the anvil 33 which supports the plastic sheets in their area of overlap during the sealing operation. To effect the joinder of the two sheets, the working face 28 of the vibrator tool is vibrated at a high frequency of at least 5,000 cycles per second and preferably in the range of 15,000 to 40,000 cycles per second and with a small amplitude in a direction normal to the surfaces to be joined. The tool and anvil are then moved toward each other (by means not shown) so that they engage the plastic sheets under a static pressure and vibratory energy is imparted to the latter for a time sufficient to seal the two materials.

In production sealing equipment, for example, sealing the end of tubes generally used for dispensing medications, shampoos, etc., the equipment is initially adjusted so that there is a fixed gap between the output surface 28 of the tool 12 and the upper surface 34 of anvil 33 when the equipment is in the position shown in FIGS. 1 and 2. What generally occurs is that the equipment operates efficiently for a period of time until there is a general increase in temperature of the vibratory tool 12 and particularly its working face 28. This temperature rise is attributable to the high stresses and strains in the tool which undergoes a change of physical dimension 20,000 times per second and dissipates energy in the form of heat causing a change in the Q of the system. The point of immediate importance is that a resonant system, as described above, will undergo a relatively large change in amplitude of vibration when its Q is changed.

The Q of a vibratory system may be defined for our purposes as its ability to convert electrical energy to vibratory energy. As the temperature of the tool increases, the Q of the system decreases thereby requiring additional power to maintain a given amplitude of vibration at the output surface of the tool. In addition, if the tool increases in temperature, we change the Q of it compared to that of the transducer resulting in a mismatch of the two sections since the resonant frequency of the tool is altered by the heat.

The heat generated at the tool face is due to both the internal friction and contact with the work object. It is appreciated that it is known in the art that there is a general reduction in the coefficient of friction between a work object and a vibratory tool since there is a physical separation of the tool surface from the work object during each cycle of vibration. But, still in all, a certain amount of the heat generated within the tool is attributable to friction between its output surface and the work object. Depending on the desired temperature of the tool output surface, the fluid to be supplied will act as either a coolant to maintain a low working temperature or in the alternative a relatively high temperature.

To continuously maintain the working face 28 of the vibratory tool 12 at a constant temperature and in turn amplitude of vibration, a heat transferring fluid is coupled to and caused to flow through a passage provided in the tool. The fluid may be a coolant, when as in plastic sealing, it is desired to maintain an equilibrium working temperature close to room temperature or at any extent below the melting point of the materials being joined. In those applications wherein an elevated surface temperature is desired, a heated fluid is used, for example, steam.

The fluid supply means 40, illustrated in FIGS. 1 and 2, is generally comprised of a passage 41 which extends through the entire tool and substantially parallel to the output surface 28 of the tool 12. The passage 41 is located in the lower section of the tool portion 26 so as to present a small wall section of the tool between said passage and the output surface 28 to permit a proper energy transfer. Although the heat conduction between the two surfaces would be best accomplished with a thin wall between the two surfaces, care must be taken to prevent cracking of the wall due to excessive wall thinness in view of the high stresses the tool is continuously exposed to.

To couple the supply of fluid to the passage 41 input conduit 43 and output conduit 44 carrying said fluid are connected by means of fittings capable of isolating the vibration of the tool. The passage 41, which might be circular in cross-section or even rectangular, is preferably circular in cross-section in the area immediately adjacent the outer surface of the tool area to provide a seat for bushings 45. The bushings are made of a resilient but non-absorbent material such as plastic, Teflon, nylon or closed cell silicone rubber sponge. The bushing 45 has an inner bore to accommodate tubular connecting members 46 which connect the bushings 45 to the conduits 43 and 44. The interfitting relation of said components is such that it will maintain a fluid tight seal with the passage and conduits. The input and output conduits 43 and 44 respectively, are tightly fitted over the outer ends of the respective tubular connecting members 46.

The tubular connecting members 46 are supported in their vertical position by means of a bracket 47 having a base portion 48 and a pair of flanges 49 extending at substantially right angles thereto with an extended lip portion 50 and an accommodating bore in said lip in which said tubular members 46 are positioned. To support the tubular members in this position shown in FIG. 1, and permit ease in disassembling of the equipment screws 51 are provided in the extended lip 50 of flange 49 and may be adjusted to firmly secure the tubular members 46 therein. The base portion 48 of bracket 47 is rigidly secured to the support block 18 as by bolts 52 as seen in FIG. 2.

It can be appreciated that, on production sealing equipment, once the spacing between the tool output surface 28 and the surface 34 of the anvil 33 is fixed, any readjustments would necessitate a shutting down of the equipment causing considerable down time. The cause of this maladjustment is usually due to the heating of the tool as well as a change in amplitude of vibration—the latter not always capable of being monitored by an automatic frequency control system.

Figure 5:
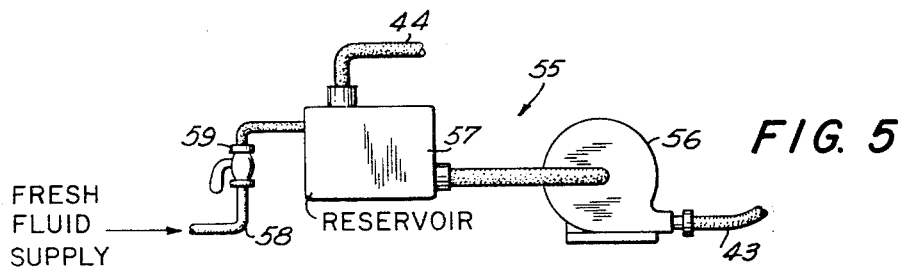
FIG. 5 is somewhat schematic representation of the pumping means for supplying a proper flow of energy transferring fluid to the vibratory tool.

To maintain the desired tool surface temperature for either a continuous or intermittent material working process, pumping means 55 as shown in FIG. 5, may be utilized with all of the embodiments of the present invention. The heat transferring fluid is supplied to the supply means 40 by means of pump 56 which forces the fluid through input conduit 43, tubular connecting member 46 and thence into the passage 41 in tool 12. By continuous operation of the pump 56, the fluid continues to flow through passage 41 and exits through tubular connecting member 46 and into the output conduit 44 and thence into reservoir 57 and eventually back to the pump 56 to be recirculated. A fresh supply of fluid is coupled through tube 58 and valve 59 to the reservoir 57 so that any fluid lost during the normal material working process may be replaced as needed and the temperature of said fluid maintained at a substantially constant temperature.

When operating the above described temperature control apparatus, the fluid circulating equipment 55 may be run continuously to maintain the tool working surface at a preselected temperature, or for certain applications, for example, intermittent material working processes, the circulatory pump 56 may be synchronized to run automatically when the vibratory tool is energized and brought in energy transferring relationship to a workpiece. It will be appreciated that the pump 56 drives the fluid through the passage 41 in sufficient volume and under sufficient pressure to provide an adequate supply of heat transferring fluid to said passage.

It has been found that the heat transferring fluid may be in the form of a gas, liquid or an atomized mixture. It is known in the art that, when a liquid is brought in contact with a vibratory surface, cavitational erosion of the surface takes place. In addition, a liquid, due to its density, tends to load the vibratory surface requiring an input of additional power to maintain the tool at a preselected amplitude of vibration. Accordingly, for certain applications, it might be desirable that the fluid be gas or an atomized mixture to avoid excessive cavitational erosion and loading of the vibratory tool.

In the equipment illustrated in FIGS. 1 and 2, for plastic sealing, a transducer 11 was employed having a rating of 600 watts to perform intermittent sealing operations on two layers of plastic each being .015 inch thick. Without the method and apparatus employed in this invention, the tool soon became overheated and improper seals were obtained. By the use of the method and apparatus herein disclosed, consistent seals over prolonged periods of time were obtained.

FIGS. 6 through 11 illustrate alternate methods of flowing a heat transferring fluid in contact with the tool at a rate sufficient to maintain the desired temperature at the working surface thereof. Specifically, each of these figures illustrates the supplying of a fluid through a passage having a major portion thereof extending substantially parallel to the tool working surface.

Figure 6:
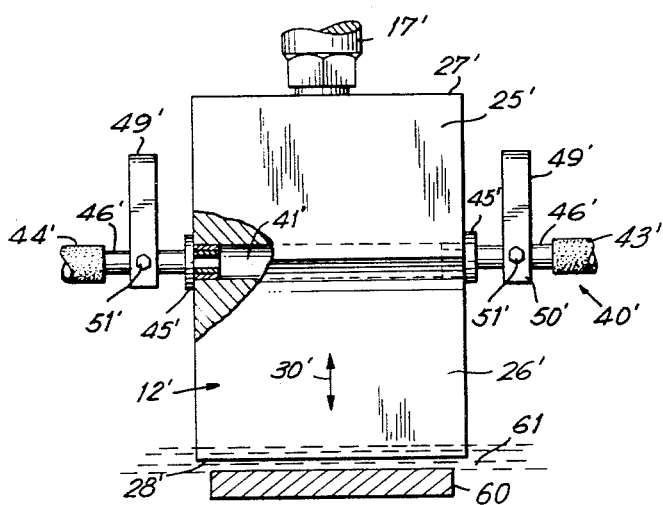
FIGS. 6 and 7 illustrate another embodiment of the invention in which the fluid passage is located in a plane of high axial stress.
Figure 7:
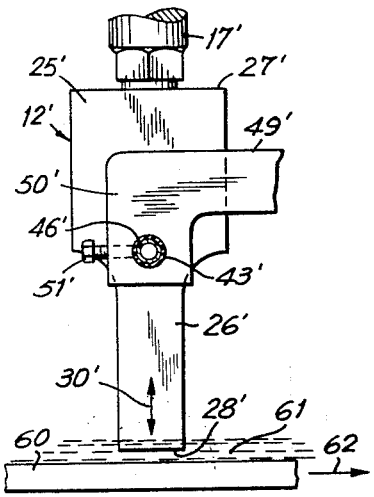

Depending upon the ultrasonic application for which the equipment is to be utilized, the positioning of the passage might vary from, for example, adjacent the tool output surface or in a plane of high axial stress. FIGS. 6 and 7 show an adaptation of the fluid supply arrangement which is similar to that discussed with respect to FIGS. 1 and 2 but wherein said passage is situated in a plane of high axial stress. As previously described with respect to the vibratory system, an unloaded system will rise in temperature due to the internal stresses of the tool and particularly at its plane of maximum axial stress. Since a major source of heat originates at the plane of maximum axial stress, it might be desirable to position the passage or conduit within said region of the tool. The length of the tool 12′ in FIGS. 6 and 7 is made approximately to correspond to one-half the wavelength of sound or integral multiples thereof traveling longitudinally therethrough. In this type of tool design, the nodal region or plane is located substantially at the middle of the tool when measured from its input surface 27′ and its output surface 28′.

This tool is of the two-step design and the difference in mass between the two halves 25′ and 26′ is located at a node of longitudinal motion which coincides with the plane of maximum axial stress. By positioning passage 41′ in this region, it is possible to continuously draw off a major portion of the heat at its origin.

The tool 12′ is secured to the connecting body 17′ of a transducer (not shown) to longitudinally vibrate the tool, as indicated by the double headed arrow 30′ whose output surface or working face 28′ is positioned in energy transferring relationship to a workpiece 60 and the vibratory energy transmitted thereto through a liquid medium 61. This material working arrangement is often utilized in high frequency cleaning, and as shown in FIG. 7, the workpiece 60 is moved relative to the tool working surface 28′ as indicated at arrow 62, so that progressive areas of said workpiece are exposed to the high frequency vibratory energy.

The tool is maintained at a desired temperature by supplying the heat transferring fluid by pumping means 55 (FIG. 5), the the fluid supply means 40′ which consists of a passage 41′ positioned substantially at a plane of high axial stress with input and output means associated therewith. To couple the supply of fluid to the passage 41′, input and output conduits 43′ and 44′ respectively are provided and connected by means of connecting members 46′ to bushings 45′ which are positioned in the passage 41′. The tubular connecting members 46′ are supported in their vertical position by means of a pair of flanges 49′ provided with a depending lip 50′ having a bore therethrough for accommodating the tubular members 46′ and may be retained in position as by set screws 51′ provided in said lip portion.

Figure 8:
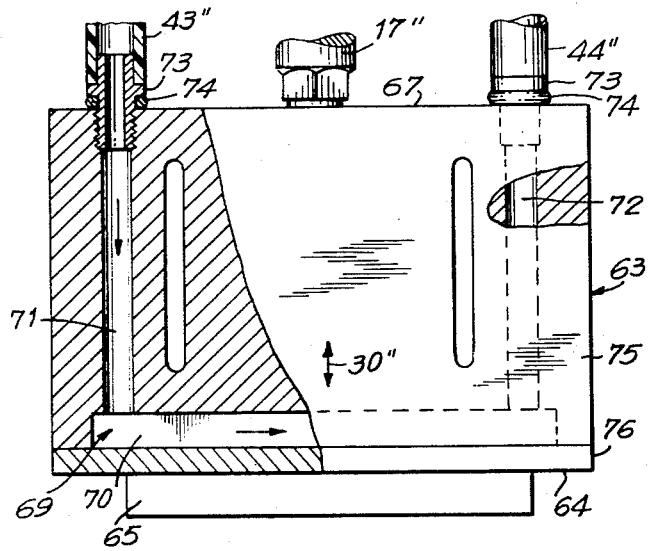
FIGS. 8 and 9 illustrate another embodiment of the invention in which a portion of the fluid passage extends adjacent the tool working surface and the passage originates and terminates on one surface of the vibratory tool.
Figure 9:
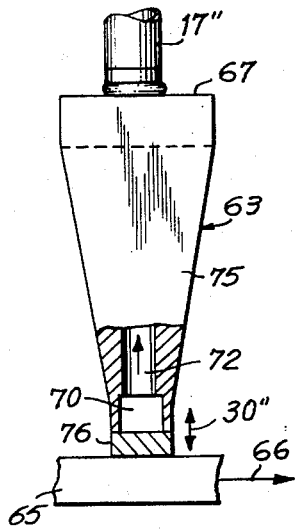

FIGS. 8 and 9 illustrate an embodiment of this invention in which a vibratory tool 63 is shown in a material working process in which its output surface 64 is in contact with a workpiece 65 while the latter may be moved in a plane transverse thereto as indicated by arrow 66. In certain applications, it is desirable that the heat transferring fluid be coupled to the vibratory tool, which may be in the form of a blade-like member, at its input surface 67 which is rigidly secured to the transducer connecting body 17″ which will cause the tool to vibrate in a plane substantially perpendicular to the workpiece 65 as indicated by the double headed arrow 30″

The blade-like tool 63, which may be designed in accordance with the teachings of U.S. Patent No. 3,113,225, titled "Ultrasonic Vibration Generator," granted Dec. 3, 1963, and assigned to the present assignee, has an internal passage 69 consisting of a groove 70, extending substantially adjacent to and parallel with the tool output surface 64, which communicates with an input channel 71 at one end thereof and an output channel 72 at its other end. The input and output channels 71 and 72 communicate with the input and output conduits 43″ and 44″ respectively by fittings 73 which are threadably engageable with the tool and wherein an O-ring 74 is provided between the tool input surface 67 and the fitting 73 to maintain a leakproof seal therebetween.

The tool 63 may be constructed in two sections when it is of substantial length and it would be difficult to machine a passage of extended length therethrough. An additional advantage of a two-piece tool, consisting of an upper section 75 and a lower section 76 which are rigidly secured to each other, as by bolts or brazing, is that, if a lower section wears or becomes pitted due to cavitational erosion, it may be easily replaced without need for an entire new tool. By providing the passage 69 in the form shown in FIGS. 8 and 9, a greater surface area of the tool is in contact with the heat transferring fluid. In this manner it is possible to simultaneously have a portion of the passage extending through a plane of maximum axial stress and a portion thereof adjacent the tool working surface. In this case, the liquid will enter through the conduit 43″ and down the input channel 71 through the groove 70 then flow adjacent the tool output surfcae 64 and exit through the output conduit 44″ via output channel 72.

Figure 10:
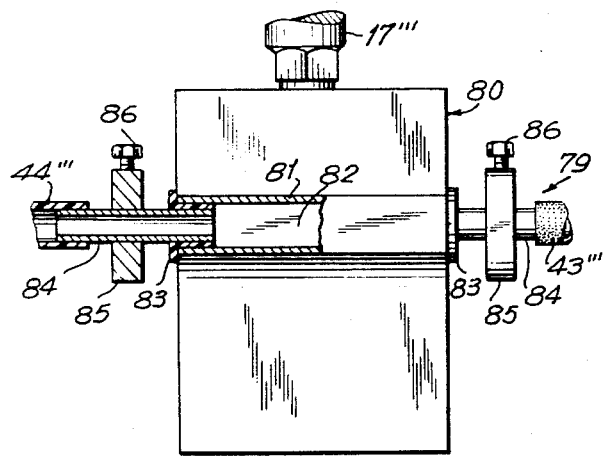
FIGS. 10 and 11 illustrate another embodiment of the invention in which the fluid passage is located exterior of the tool.
Figure 11:
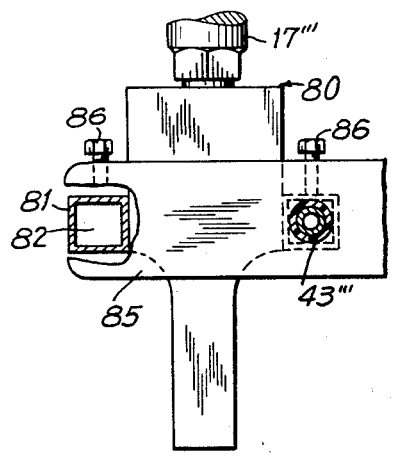

In FIGS. 10 and 11, the heat transferring fluid is coupled to a fluid supply means 79 having one or more passages positioned exterior of the tool. A vibratory tool 80 is rigidly secured to a connecting body 17‴ and is provided with one or more tubular members 81 rigidly secured, as by brazing, to the tool outer surface at substantially a plane of high axial stress. To couple the supply of fluid to the internal passage 82 of tubular member 81, a bushing 83 is fitted into each end of the tubular member 81 and said bushing has a bore therethrough which accommodates tubular connecting members 84 which are respectively attached to the input conduit 43‴ and output conduit 44‴.

The fluid supply assembly may be supported by a pair of brackets 85 that are provided with one or more bores to accommodate the tubular connecting members 84 and set screws 86 to retain said connecting members in place.

From the above, it will be apparent that this invention employs a vibratory tool having a working surface which is to be maintained at a substantially constant or controlled temperature. Although the embodiments of the invention herein illustrated show the vibratory energy being transmitted to a workpiece from the output surface of said tool, it is apparent that other means may be employed. In the extrusion of materials, for example, a bore is usually contained within the tool itself through which the material being extruded is passed and the surface of this bore would be the tool working surface. In other applications, a tool may be rigidly attached to the output surface of the vibratory member and said tool maintained at a controlled temperature by flowing the heat transferring fluid in communication with said vibratory member.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

We claim:
1. The method of maintaining the working surface of a vibratory tool at a controlled temperature, comprising the steps of:
 (A) vibrating the working surface at a high frequency of at least 5,000 cycles per second and with a small amplitude of vibration in the direction perpendicular to its working surface,
 (B) supplying a source of heat transferring fluid in an atomized state to the vibratory tool, and
 (C) flowing said fluid through a passage provided in the tool having a portion thereof extending substantially parallel to the working surface of the tool to regulate the temperature of said surface.

2. The method of maintaining the working surface of a vibratory tool at a controlled temperature, comprising the steps of:
 (A) vibrating the working surface at a high frequency of at least 5,000 cycles per second and with a small amplitude of vibration in the direction perpendicular to its working surface,
 (B) supplying a source of heat transferring fluid in a gaseous state to the vibratory tool, and
 (C) flowing said fluid through a passage provided in the tool having a portion thereof extending substantially parallel to the working surface of the tool to regulate the temperature of said surface.

References Cited

UNITED STATES PATENTS

| | | | |
|---|---|---|---|
| 2,397,400 | 3/1946 | Barwich | 113—112 |
| 2,498,737 | 2/1950 | Holden | 259—1 |
| 2,846,563 | 8/1958 | Cronin | 219—86 |
| 2,960,314 | 11/1960 | Bodine | 165—84 X |
| 3,165,299 | 1/1965 | Balamuth et al. | 259—1 |

FOREIGN PATENTS

| | | |
|---|---|---|
| 532,144 | 1/1941 | Great Britain. |
| 703,232 | 2/1965 | Canada. |

LLOYD L. KING, *Primary Examiner.*

ALBERT W. DAVIS, *Assistant Examiner.*

U.S. Cl. X.R.

165—47; 156—73, 380, 498; 51—59; 228—1; 29—470.3